(12) United States Patent
van Groenestijn et al.

(10) Patent No.: US 10,401,515 B2
(45) Date of Patent: Sep. 3, 2019

(54) ESTIMATION OF WATER PROPERTIES FROM SEISMIC DATA

(71) Applicant: PGS Geophysical AS, Oslo (NO)

(72) Inventors: Gert-Jan Adriaan van Groenestijn, Leiden (NL); Rolf Huibert Baardman, Leiden (NL); Rob Franciscus Hegge, Leiden (NL)

(73) Assignee: PGS Geophysical AS, Oslo (NO)

( * ) Notice: Subject to any disclaimer, the term of this patent is extended or adjusted under 35 U.S.C. 154(b) by 1032 days.

(21) Appl. No.: 14/613,620

(22) Filed: Feb. 4, 2015

(65) Prior Publication Data
US 2015/0369936 A1    Dec. 24, 2015

Related U.S. Application Data

(60) Provisional application No. 62/013,927, filed on Jun. 18, 2014.

(51) Int. Cl.
*G01V 1/30* (2006.01)
*G01V 1/38* (2006.01)

(52) U.S. Cl.
CPC .............. *G01V 1/305* (2013.01); *G01V 1/303* (2013.01); *G01V 1/3817* (2013.01); *G01V 1/38* (2013.01); *G01V 1/3835* (2013.01); *G01V 2210/6222* (2013.01)

(58) Field of Classification Search
CPC . G01V 1/362; G01V 1/36; G01V 1/38; G01V 1/3808; G01V 1/24; G01V 1/3835; G01V 1/308; G01V 1/364; G01V 1/305; G01V 1/303; G01V 1/3817; G01V 2210/6222; G01S 5/22

USPC .............................. 702/6, 18, 4; 367/131, 24
See application file for complete search history.

(56) References Cited

U.S. PATENT DOCUMENTS

| | | | |
|---|---|---|---|
| 5,930,731 A | 6/1999 | Brzostowski | |
| 6,826,501 B1* | 11/2004 | Carvill | G01V 1/362 367/21 |
| 2003/0074140 A1 | 4/2003 | MacKay | |
| 2006/0291328 A1* | 12/2006 | Robertsson | G01V 1/36 367/24 |
| 2008/0008031 A1* | 1/2008 | Vigen | G01V 1/3835 367/15 |
| 2008/0255762 A1* | 10/2008 | Carvill | G01V 1/3808 702/18 |

(Continued)

OTHER PUBLICATIONS

Search Report for Related GB Application GB1510104.1, dated Dec. 4, 2015 (3 pgs).

(Continued)

*Primary Examiner* — Regis J Betsch
*Assistant Examiner* — Kaleria Knox

(57) ABSTRACT

A method for estimation of water properties from seismic data can include determining a number of travel times for at least one event based, at least in part, on predefined values for a plurality of water properties, determining an alignment of data values for each of the number of travel times determined for the at least one event, and determining an estimation of a plurality of undetermined water property values based, at least in part, on the alignment of the data values for each of the number of travel times producing a high quantitative measure of a coherence value.

24 Claims, 6 Drawing Sheets

(56) References Cited

U.S. PATENT DOCUMENTS

| | | | |
|---|---|---|---|
| 2010/0061187 A1* | 3/2010 | Sodal | G01S 5/22 |
| | | | 367/131 |
| 2011/0242937 A1 | 10/2011 | Sollner et al. | |
| 2012/0020185 A1* | 1/2012 | Welker | G01V 1/38 |
| | | | 367/16 |
| 2012/0026833 A1* | 2/2012 | Soubaras | G01V 1/282 |
| | | | 367/50 |
| 2013/0028049 A1 | 1/2013 | Pan | |
| 2013/0144535 A1 | 6/2013 | Boelle et al. | |
| 2013/0238249 A1* | 9/2013 | Xu | G01V 1/303 |
| | | | 702/18 |
| 2015/0006085 A1* | 1/2015 | Bisley | G01V 1/36 |
| | | | 702/14 |
| 2015/0185348 A1* | 7/2015 | Turnbull | G01V 1/362 |
| | | | 702/14 |
| 2015/0253447 A1* | 9/2015 | Mukhopadhyay | G01V 1/24 |
| | | | 702/6 |
| 2015/0301211 A1* | 10/2015 | Lacombe | G01V 1/308 |
| | | | 702/18 |

OTHER PUBLICATIONS

Office Action for Related MX Application MX/A/2015/007812, dated May 23, 2018 (Original Copy and English Translation) (3 pgs & 3 pgs).

Office Action for Related MX Application MX/A/2015/007812, dated Oct. 8, 2018 (Original Copy and English Translation) (4 pgs & 5 pgs).

* cited by examiner

ESTIMATION OF WATER PROPERTIES FROM SEISMIC DATA

CROSS-REFERENCE TO RELATED APPLICATIONS

This application claims priority to U.S. Provisional Application 62/013,927, filed Jun. 18, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a source vessel tows one or more seismic sources below the surface of the water and over a subterranean formation to be surveyed for mineral deposits. Seismic receivers may be located on or near the water bottom, on one or more streamers towed by the source vessel near the water surface, or on one or more streamers towed by another vessel. The source vessel typically contains marine seismic survey equipment, such as navigation control, seismic source control, seismic receiver control, and recording equipment.

The seismic source control may cause the one or more seismic sources, which can be air guns, marine vibrators, etc., to produce acoustic signals at selected times (often referred to as "firing a shot" or "shooting"). Each acoustic signal is essentially a sound wavefield that travels through the water. The seismic receivers thereby measure a wavefield that was ultimately initiated by the actuation of the seismic source. In this sense, the acoustic signals (or "shots") are fired at the seismic receivers and the seismic receivers measure a wavefield based on the actuation of the seismic sources.

DETAILED DESCRIPTION

Figure 1:
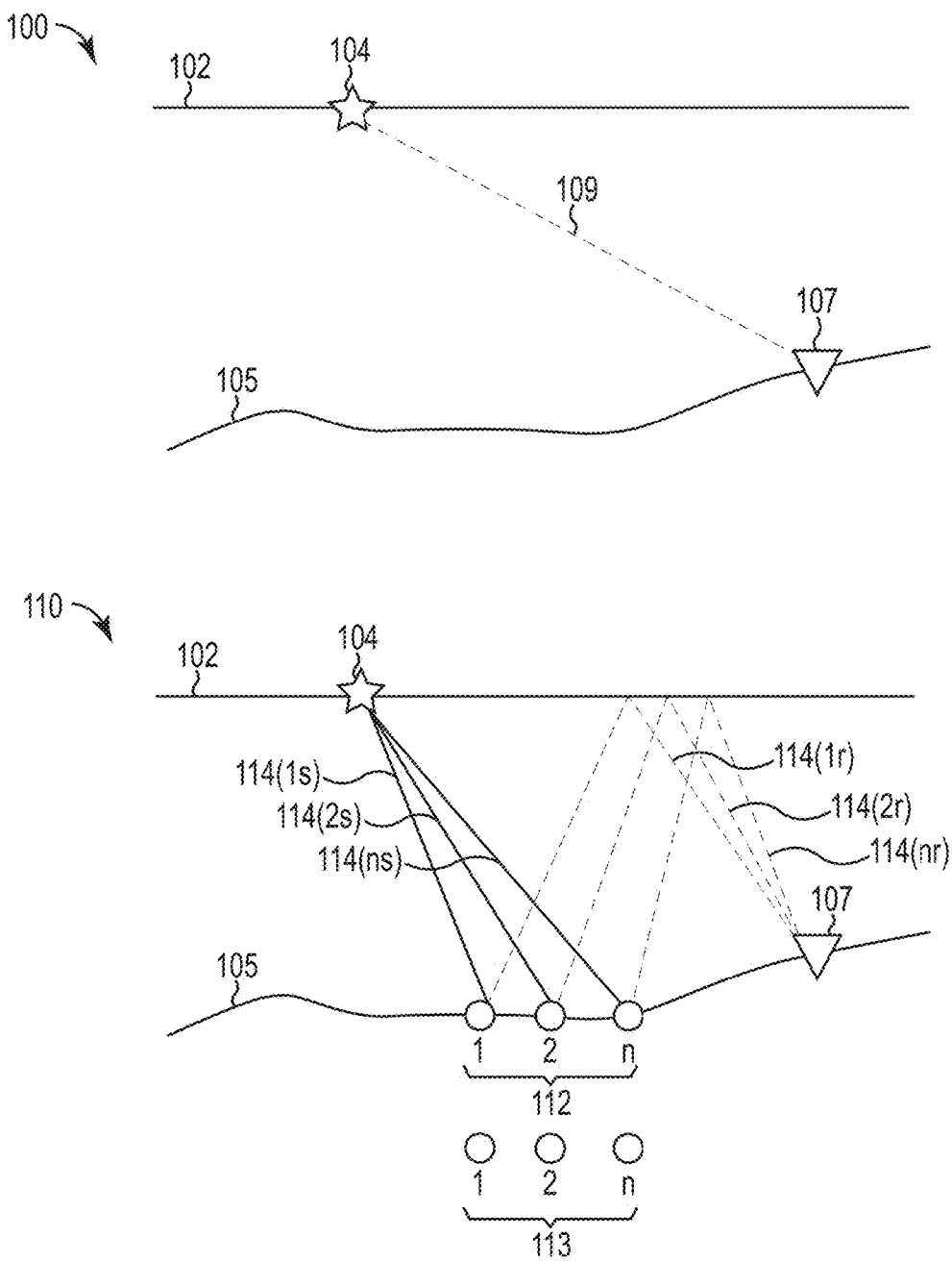
FIG. 1 illustrates examples of directions of acoustic signals generated by a seismic source as received by a seismic receiver for subsequent processing and analysis to estimate water property values from seismic data according to one or more example embodiments of the present disclosure.

This disclosure is related generally to the field of marine seismic surveying. For example, this disclosure may have applications in marine seismic surveying in which one or more seismic sources are used to generate wavefields that interact with subsurface formations and seismic receivers, either towed or ocean bottom, are used to receive seismic energy generated by the seismic sources and, possibly, affected by the interaction with the subsurface formation. For instance, examples of the present disclosure may specifically include estimating water properties from seismic data.

In various embodiments, a plurality of seismic receivers may be disposed on one or more near-surface streamers, one or more ocean bottom cables (OBCs), a plurality of nodes near or on the water bottom, or any combination thereof. In some examples, seismic receivers may be used to detect and/or record signals to be processed according to the present disclosure.

A seismic source can include a number of air guns, water guns, explosive devices, vibratory devices, and/or passive sources, among others. Passive sources can include natural earthquakes of limited intensity, cracking reservoirs resulting from water input, among other examples. The wavefield constitutes pressure variations in a fluid as a function of time caused by a transient perturbation of pressure by an acoustic signal generated by actuation of the seismic source. Positions on the water bottom, and possible other seismic reflectors associated with and/or below the water bottom, can be detected based upon a time taken for a portion of the wavefield to directly transit from the seismic source to at least one seismic receiver associated with the water bottom, a time taken for a primary reflection from the water bottom and/or the other seismic reflectors to at least one seismic receiver near a free surface of the water surface, and/or, as described herein, first order (and higher) water bottom multiples resulting from reflection of portions of the wavefield by the water surface.

Positioning of the water bottom, underlying sediments, geological layers, petroleum and/or gas reservoirs, among other structures, having different seismic reflection characteristics based upon the transit time of the wavefield can be complicated by uncertainties in various water properties that can affect the seismic data. Further complications can result from difficulty in distinguishing detection of a direct arrival of the wavefield from detection of primary and/or multiple reflections of the wavefield by the various structures associated with the water bottom. The entirety of each of these types of reflections, or portions thereof (such as being detected by separated receiver lines), are termed "events" herein. For example, a distance of the seismic source above the water bottom and associated structures can be undetermined at the time of the seismic survey due to a change in water depth relative to a previous seismic survey and/or the travel velocity of the wavefield can vary between the seismic surveys based on the density of the water changing, for instance, by differences in temperature, pressure, salinity, etc.

The travel time of the wavefield may be determined, at least in part, by the distance the wavefield transits divided by the velocity of the wavefield. As such, uncertainties in water properties, such as those affecting the travel time of the wavefield, can reduce accuracy of and confidence in positioning of the structures associated with the water bottom, for instance, between samplings within a seismic survey and/or between separate seismic surveys, such as one conducted in January and another conducted in June.

Accordingly, as described herein, a method for estimation of water properties from seismic data can include determining a number of travel times for at least one event based, at least in part, on predefined values for a plurality of water properties, determining an alignment of data values for each of the number of travel times determined for the at least one event, and determining an estimation of a plurality of undetermined water property values based, at least in part, on the alignment of the data values for each of the number of travel times producing a high quantitative measure of a coherence value.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more". Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

FIG. 1 illustrates examples of directions of acoustic signals generated by a seismic source as received by a seismic receiver for subsequent processing and analysis to estimate water property values from seismic data according to one or more example embodiments of the present disclosure. As shown at 100 in FIG. 1, a seismic source 104 at or near a water surface 102 can be actuated to generate an acoustic signal 109, shown as a "ray", representing a portion of the wavefield that directly transits from the seismic source 104 to a particular seismic receiver 107 associated with the water bottom 105.

A direct wavefield travel time ($t_{dw}$) can be calculated from three-dimensional (3D) coordinates for the seismic source 104 ($s_x$, $s_y$, $s_z$) and the seismic receiver 107 ($r_x$, $r_y$, $r_z$) and the velocity (v) of the wavefield in water at the time of the seismic survey as follows:

$$t_{dw} = \sqrt{(s_x - r_x)^2 + (s_y - r_y)^2 + (s_z - r_z)^2}/v \quad (1)$$

When the actual or relative position values for coordinates $s_x$, $s_y$, $r_x$, $r_y$, and $r_z$ are known, these values can be referred to as predefined values, such that only the values for $s_z$ and v remain to be determined by equation 1. The vertical distance $s_z$ from the seismic source 104 to the seismic receiver 107 (source height) can relate directly to the height of the water surface 102, as the seismic source typically floats a little bit below the surface. When the depth of the seismic source 104 relative to the water surface 102 is significant relative to the vertical distance $s_z$, the depth may be taken into account separately. Direct wavefield arrival times can be calculated for sets of $s_z$ and v values.

As shown at 110 in FIG. 1, the seismic source 104 at or near the water surface 102 can generate a number of acoustic signals, represented as source-side rays 114(1s), 114(2s), . . . , 114(ns), that transit on the side of the seismic source 104 to respective points ("bounce points") 112(1), 112(2), . . . , 112(n) on the water bottom 105. In some embodiments, bounce points 113(1), 113(2), . . . , 113(n) can include structures associated with and/or below the water bottom 105, such as markers, underlying sediments, geological layers, petroleum and/or gas reservoirs, among other structures. The source-side rays 114(1s), 114(2s), . . . , 114(ns) can be reflected by the water bottom 105, or structures associated with the water bottom, followed by the receiver side rays 114(1r), 114(2r), . . . , 114(nr) being reflected from the air/water interface at the water surface 102 before transiting to the particular seismic receiver 107 associated with the water bottom 105, thereby constituting a first order water bottom multiple.

In various embodiments, the actual and/or relative positions of the bounce points 112(1), 112(2), . . . , 112(n) on the water bottom 105 can be determined prior to, during, or after a seismic survey. For instance, 3D water bottom coordinates $b_x$, $b_y$, and $b_z$ of each bounce point can be determined by sonar detection, a robot survey, and/or knowledge from previous surveys, among other techniques for determining the 3D water bottom coordinates of the bounce points 112(1), 112(2), . . . , 112(n). The number and/or location of the bounce points for which 3D coordinates are determined can be chosen to provide a representative sample, for instance, depending on the composition and/or topology of the water bottom 105. Moreover, although only one seismic receiver 107 is shown associated with the water bottom 105 in FIG. 1 at 100 and 110, various embodiments of the present disclosure can include a plurality of seismic receivers disposed on one or more streamers, one or more OBCs, a plurality of nodes near or on the water bottom, or any combination thereof.

A first order water bottom multiple travel time ($t_{m1}$) can be calculated from 3D coordinates for the seismic source 104 ($s_x$, $s_y$, $s_z$), the seismic receiver 107 ($r_x$, $r_y$, $r_z$), and the bounce point ($b_x$, $b_y$, $b_z$), and the velocity (v) of the wavefield in water at the time of the seismic survey as follows:

$$t_{m1_{sourceside}}(b_x, b_y) = \sqrt{(s_x - b_x)^2 + (s_y - b_y)^2 + (s_z - b_z)^2}/v \quad (2a)$$

$$t_{m1_{receiverside}}(b_x, b_y) = \sqrt{(r_x - b_x)^2 + (r_y - b_y)^2 + ((s_z - r_z) + (s_z - b_z))^2}/v \quad (2b)$$

$$t_{m1minimum} = \text{minimum of}(t_{m1_{sourceside}}(b_x, b_y) + t_{m1_{receiverside}}(b_x, b_y)) \quad (2c)$$

Values for $t_{m1_{sourceside}}(b_x, b_y)$ and $t_{m1_{receiverside}}(b_x, b_y)$ in equations 2a and 2b, respectively, are calculated using the 3D coordinates for each of the bounce points, for instance, bounce points 112(1), 112(2), . . . , 112(n) on the water bottom 105 shown at 110 in FIG. 1.

Selection of a minimum travel time $t_{m1minimum}$ in equation 2c corresponds to the minimum value for $t_{m1_{sourceside}}(b_x, b_y)$ summed with $t_{m1_{receiverside}}(b_x, b_y)$ in equations 2a and 2b as calculated using the 3D coordinates for each of the bounce points, which corresponds to a principle of minimum travel time. As with direct arrival, when the actual or relative position values for coordinates $s_x$, $s_y$, $r_x$, $r_y$, $r_z$, $b_x$, $b_y$, and $b_z$ are known as predefined values, only the values for $s_z$ and v remain to be determined for the first order water bottom multiple in equations 2a-2c. In this example, $b_z$ may be considered a function of $b_x$ and $b_y$, and the role of $s_z$ in ($s_z-r_z$) and ($s_z-b_z$) is to give a value to the height of the water. Calculation of travel times as shown in equations 1 and 2a-2c are presented by way of example and not by way of limitation. That is, alternatively or in addition, other equations for calculation of travel times can be used, for instance using non-straight travel pathways.

In various examples of the present disclosure, the calculation of travel times for the events can apply different weights to events measured at different distances from a seismic source, to compensate for the amplitude of the events falling inversely proportional to the distance. Alternatively or in addition, calculation of travel times for the events can apply different phase rotations to events measured at different angles relative to the seismic source, for example, as shown in FIG. 1 at 110 for the number of acoustic signals, represented as rays 114(1), 114(2), . . . , 114(n), reflected by bounce points 112(1), 112(2), . . . , 112(n) at different positions.

Figure 2:
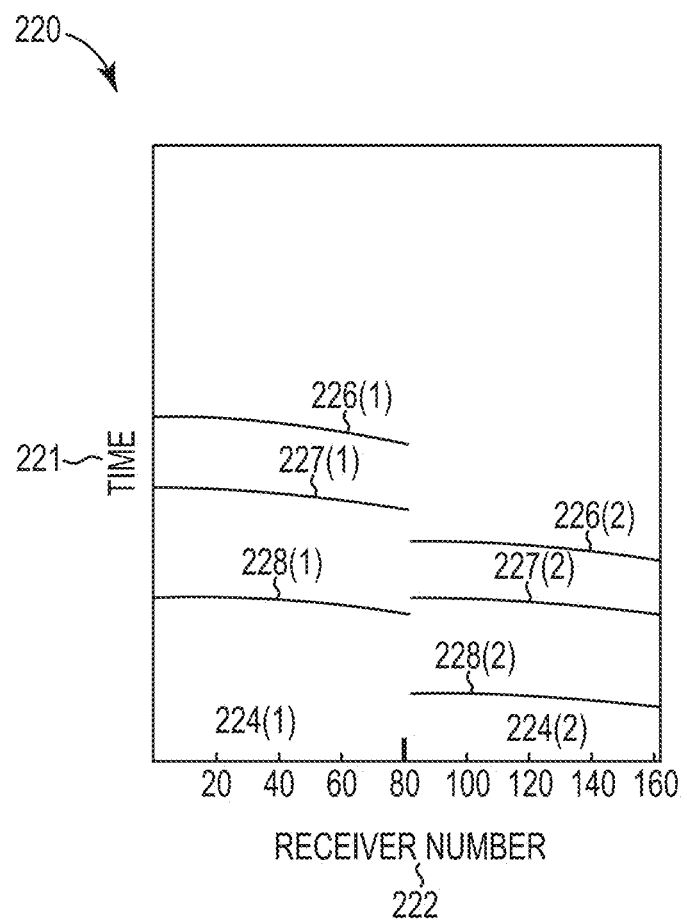
FIG. 2 illustrates an example shot point gather as received by two lines of seismic receivers according to one or more embodiments of the present disclosure.

FIG. 2 illustrates an example shot point gather as received by two lines of seismic receivers according to one or more embodiments of the present disclosure. As used herein, a shot point gather is a set of traces related to actuation of a single seismic source, where each trace in the gather represents seismic data recorded at a different seismic receiver position. The shot point gather 220 illustrated in FIG. 2 shows a time 221 at which an event, as described herein, resulting from actuation of a seismic source is detected and/or measured by each of a number of seismic receivers 222. By way of example and not limitation, events 226(1), 226(2), 227(1), 227(2), 228(1), and 228(2) shown in FIG. 2 would be detectable by a geometry of the number of seismic receivers 222 that consists of two receiver lines 224(1), 224(2) of 2 kilometers (km) length and 2 km apart, and one shot from a source sailline (trajectory of the source vessel) with an offset of 4 km from the nearest receiver line, for example, as illustrated FIG. 1 with a single seismic receiver 107. In the example shown in FIG. 2, each of the two receiver lines 224(1), 224(2) includes 80 seismic receivers.

FIG. 2 illustrates the time between actuation of the seismic source and detection by each of the seismic receivers 1-80 in receiver line 224(1) of a direct arrival event 226(1), a first order water bottom multiple event 227(1), and a second order water bottom multiple event 228(1). FIG. 2 also illustrates the time between actuation of the seismic source and detection by each of the seismic receivers 81-160 in receiver line 224(2), separated by 2 km from receiver line 224(1), of a direct arrival event 226(2), a first order water bottom multiple event 227(2), and a second order water bottom multiple event 228(2).

To illustrate calculation of travel times for direct arrival, travel time of the first order water bottom multiple, and/or travel time of a combination of the direct wave, the primary water bottom reflection, and/or the first order water bottom multiple, a synthetic dataset has been created using a model with one seismic reflector (the water bottom). As illustrated in FIG. 2, the direct arrival event and the first and second water bottom multiple events are modeled, although the description presented herein for estimation of water properties from seismic data is applicable to a primary water bottom reflection event and/or higher order water bottom multiple events in addition to or in place of these events.

Figure 3:
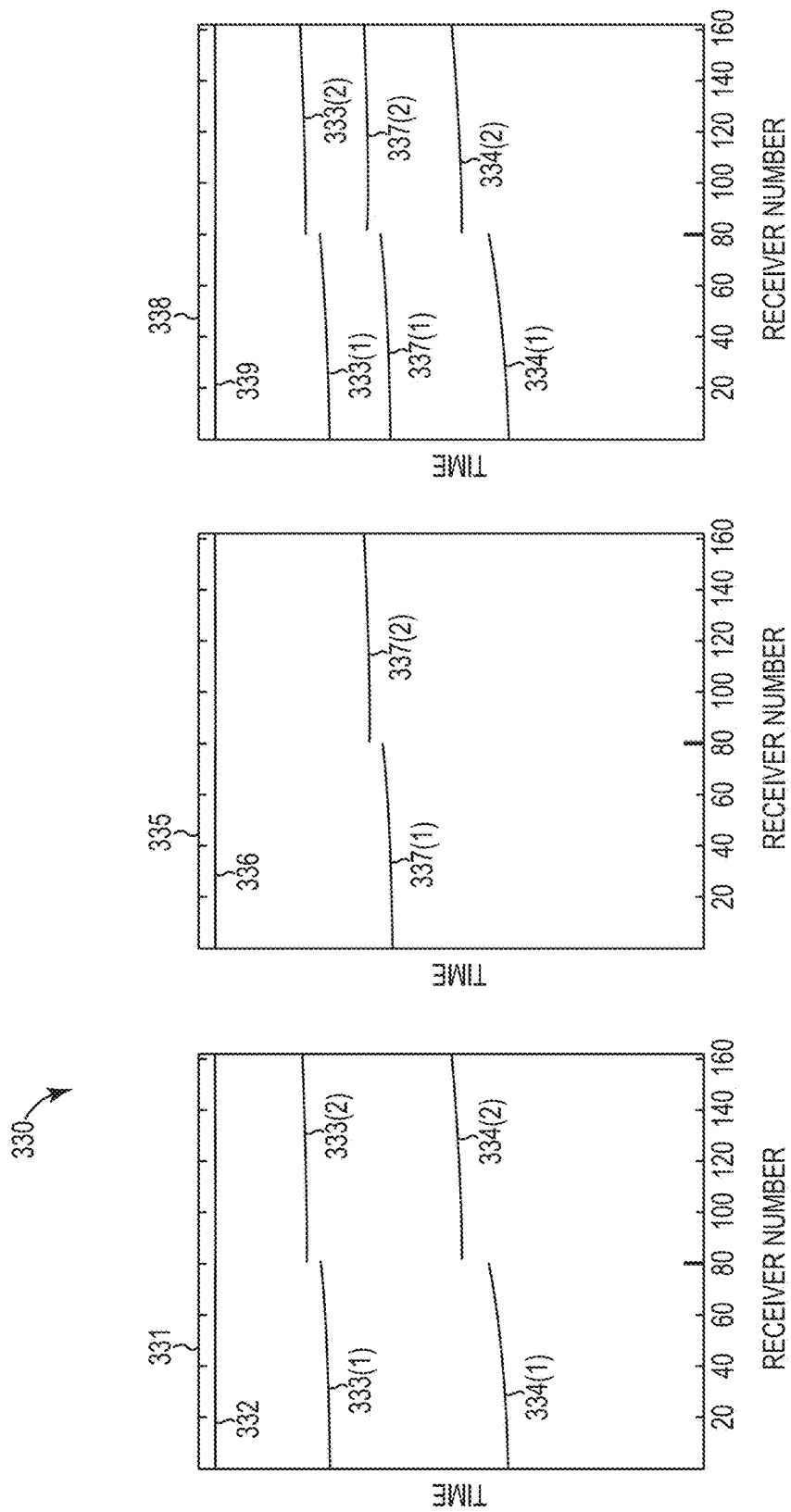
FIG. 3 illustrates examples of alignments for events shown in FIG. 2 according to one or more embodiments of the present disclosure.

FIG. 3 illustrates examples of alignments 330 for the events 226(1), 226(2), 227(1), 227(2), 228(1), and 228(2) shown in FIG. 2 according to one or more embodiments of the present disclosure. For example, time differences for detection of an event due to increasing distance of seismic receivers from the seismic source are evidenced in FIG. 2 by the downward slope of the shot point gathers for each of the events 226, 227, and 228 for receiver lines 224(1), 224(2) and the lower positioning of the shot point gather for receiver line 224(2) relative to 224(1).

In contrast, as shown in FIG. 3, the time differences for detection of the event resulting from the increasing distance of seismic receivers from the seismic source can be compensated for to provide alignment of traces for a single event across all seismic receivers such that the event appears to be detected by all the seismic receivers at the same time, which can be represented by a straight line at the top of a matrix that is representative of a shot point gather after such alignment. The various event travel times described herein can be indicated by data values, which can be represented on the vertical axes shown in FIG. 3. For example, if the data values for the travel times of the direct arrival event are aligned, as shown at 332 in matrix 331, the aligned traces can be shown, in some embodiments, at zero seconds. As described herein, a range of times can be calculated by including a number of different values for each of $s_z$ and v, in sets of $s_z$ and v values, as input for equation 2c, for example.

A first matrix 331 in FIG. 3 shows shot point gather data after alignment of the data values for the direct arrival events 226(1), 226(2), as shown in FIG. 2, for a direct arrival travel time 332 for both receiver lines 224(1), 224(2). The data values representing the first order water bottom multiple events 227(1), 227(2) and the second order water bottom multiple events 228(1), 228(2), as shown in FIG. 2, are affected by the aligned direct arrival travel time 332 for both receiver lines 224(1), 224(2), such that these events 333(1), 333(2), 334(1), 334(2) still have separate portions but the portions now have upward slopes.

A second matrix 335 in FIG. 3 shows shot point gather data after alignment of the data values for the first order water bottom multiple events 227(1), 227(2), as shown in FIG. 2, for a first order water bottom multiple travel time 336 for both receiver lines 224(1), 224(2). The data values representing the second order water bottom multiple events 228(1), 228(2), as shown in FIG. 2, are affected by the aligned first order water bottom multiple travel time 336 for both receiver lines 224(1), 224(2), such that these events 337(1), 337(2) still has separate portions but the portions now have upward slopes. The direct arrival events 226(1), 226(2), as shown in FIG. 2, have been shifted out of the frame of the second matrix 335 in FIG. 3 and do not appear therein.

In various embodiments, determination of alignment of the horizontally aligned data values can include compensation for polarity flips to produce a third matrix 338. For example, a first order water bottom multiple can be multiplied by −1 to compensate for its polarity flip. In various embodiments, determination of alignment of the horizontally stacked values can include an estimated wavelet to produce the third matrix 338. For example, wavelet estimation can be a reflection coefficient series from a well within the boundaries of the seismic survey that can be used to estimate the wavelet phase and/or frequency. The wavelet estimate can be a function of the direction of measurement so as to compensate for different angles relative to the seismic source, for example, as shown in FIG. 1 at 110 for the number of acoustic signals, represented as rays 114(1), 114(2), . . . , 114(n), reflected by bounce points 112(1), 112(2), . . . , 112(n) at different positions.

The third matrix 338 in FIG. 3 shows shot point gather data after overlay of the aligned data values for the direct arrival travel time 332 of the first matrix 331 with the aligned data values for the first order water bottom multiple travel time 336 of the second matrix 335 and subtraction of all the data values of the second matrix 335 from aligned corresponding data values of the first matrix 331 to yield the third matrix 338.

Accordingly, the third matrix 338 shows shot point gather data at the earliest time 339 representing aligned data values for the first order water bottom multiple travel time 336 subtracted from aligned data values for the direct arrival travel time 332. Next in time in the third matrix 338 are events 333(1) and 333(2) representing the first order water bottom multiples shown in the first matrix 331, then events 337(1) and 337(2) representing the second order water bottom multiples shown in the second matrix 335, and lastly, in this embodiment, events 334(1) and 334(2) representing the second order water bottom multiples shown in the first matrix 331. Due to the events 333(1) and 333(2), 337(1) and 337(2), and 334(1) and 334(2) in the third matrix 338 still having separate portions and not overlapping with each other, the data values are relatively unaffected by the data value subtraction, and still have the separate portions with upward slopes.

In some embodiments, a matrix to serve a function equivalent to the third matrix 338 in FIG. 3 can be produced after overlay of the aligned data values for the direct arrival travel time 332 of the first matrix 331 with the aligned data values for the first order water bottom multiple travel time 336 of the second matrix 335 by multiplication of a selected number or all the data values of the second matrix 335 by corresponding data values of the first matrix 331.

In various embodiments described herein, estimation of undetermined water property values can be based, at least in part, on the alignment of the data values for each of the number of travel times producing a high (or highest) quantitative measure of a coherence value. By way of example and not limitation, such a coherence value can be determined by calculating a number of values for correlation coefficients, complex cross-correlation coefficients, semblance coefficients, and/or complex semblance coefficients, among others. In various embodiments, for example, prior to calculation of a number of values for semblance coefficients and/or complex semblance coefficients, the data values in the third matrix 338 for each of the seismic receivers can be horizontally stacked by summing the data values representative of the measurements of the plurality of seismic receivers to provide a single trace. In various embodiments, the summing can be limited to a small time window around the aligned event. For example, the summing can be limited to 40 milliseconds above and below the aligned event.

Figure 4:
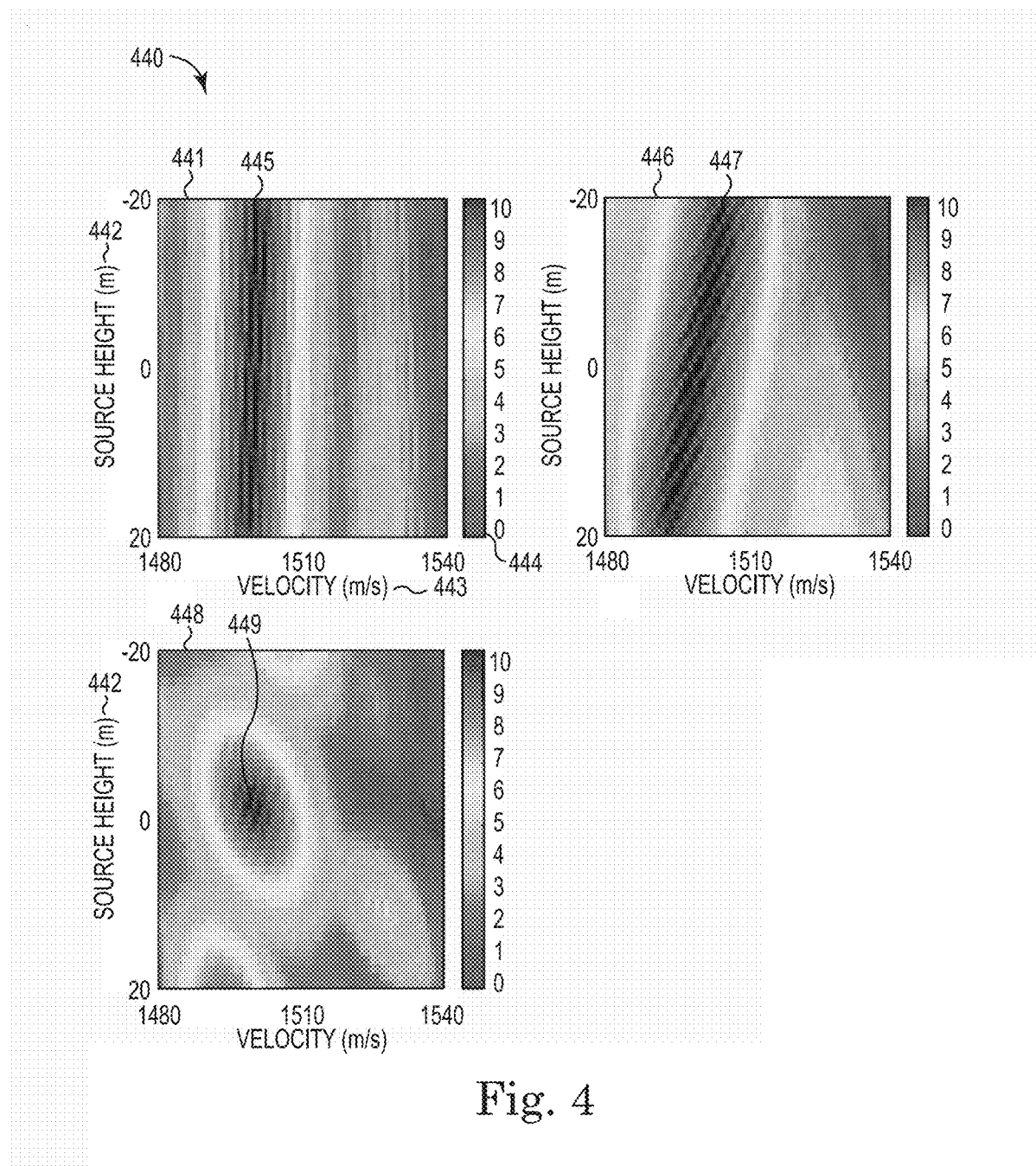
FIG. 4 illustrates examples of semblance values for estimation of previously undetermined water property values according to one or more embodiments of the present disclosure.

FIG. 4 illustrates examples of semblance values for estimation of previously undetermined water property values 440 according to one or more embodiments of the present disclosure. In geophysics, a semblance value is a quantitative measure of the coherence of seismic data from multiple channels, such as the plurality of seismic receivers in the third matrix 338 in FIG. 3, which is equal to the energy of a stacked trace divided by the energy of all the traces making up the stack. As such, the data values for traces can be horizontally stacked together and a semblance value can be calculated by summing the squares of each stacked sample data value. When data values from all channels are coherent, showing continuity from trace to trace, the semblance value can be expressed with a value as high as 1.0. In contrast, when the data values from all channels show low coherence, the semblance value can be expressed with a value as low as 0.0.

The semblance values for a set, for example a pair, of different water property values can be plotted in a graph, as illustrated in FIG. 4, where each of the x/y values (pixels) can represent a different semblance value. For example, each of the graphs 441, 446, 448 in FIG. 4 includes the source height 442 as one of the previously undetermined water property values and the water velocity 443 (the velocity (v) of the wavefield in water proximate the seismic source at the time of actuation of the seismic source) as the second previously undetermined water property value.

The source height 442 shown on the y axis of FIG. 4 is expressed as a variance in increments of a meter (m) from 20 m below (−20) to 20 m above (20) a predetermined level (0). The predetermined level can, in some embodiments, be related to an average water height determined from measurements over an extended time frame (e.g., a year, among other possible time frames). Because the seismic source can be associated with a marine seismic survey vessel, the source height 442 can vary corresponding to an effect of the water height (e.g., related to tides, rainfall, etc.) on the height of the marine seismic survey vessel above the water bottom. The velocity shown on the x axis of FIG. 4 is expressed as a variance in velocity in meters per second (m/s) for a wavefield in water in a range of from 1480 m/s to 1540 m/s.

The units shown on the x and y axes for the semblance values for estimation of previously undetermined water property values 440 are illustrated by way of example and not limitation. Similarly, the scale 444 (0-10) shown for the quantitative measure of the semblance values is shown by way of example and not limitation. That is, the scale 444 can, in various embodiments, be the same or differ between graphs 441, 446, 448, dependent, for example, on the values determined during horizontal stacking of the aligned vales shown in the third matrix 338 of FIG. 3, and/or combination of the semblance graphs, as described herein, among other factors.

Graph 441 in FIG. 4 shows a contour graphical representation of numerical semblance values for the source height 442 and the water velocity 443 derived from stacking of the aligned data values for the direct arrival travel times 332, first order water bottom multiple events 333(1), 333(2), and second order water bottom multiple events 334(1), 334(2) from the first matrix at 331 of FIG. 3. Graph 446 shows a contour graphical representation of numerical semblance values for the source height 442 and the water velocity 443 derived from stacking of the aligned data values for the first order water bottom multiple travel time 336 and second order water bottom multiple events 337(1), 337(2) from the second matrix at 335 of FIG. 3. Graph 448 shows a contour graphical representation of numerical semblance values for the source height 442 and the water velocity 443 derived from stacking of the aligned data values for the first order water bottom multiple travel time 336 subtracted from aligned direct arrival travel time 332, shown at 339 of FIG. 3, the first order water bottom multiple events 333(1), 333(2), the second order water bottom multiple events 337(1), 337(2), and the second order water bottom multiple events 334(1), 334(2) from the third matrix at 338 of FIG. 3.

A highest semblance value (e.g., a highest numerical value for a pixel in a graph) can be considered to correspond to a best estimate of water property values. For example, the highest semblance value for the source height 442 and/or the water velocity 443, shown in graphs 441, 446, 448, can be considered a best estimate of the undetermined values for $s_z$ and/or v in equations 1 and 2a-2c.

As seen in graph 441, the highest semblance values for the water velocity 443 can be found in a range 445 centered around approximately 1500 m/s, although the source height remains undetermined, based upon the stacking of the aligned data values for the direct arrival travel times 332, first order water bottom multiple events 333(1), 333(2), and second order water bottom multiple events 334(1), 334(2) from the first matrix 331 of FIG. 3. As seen in graph 446, the highest semblance values for the water velocity 443 can be found in a broader range 447 centered around approximately 1500 m/s, although the source height remains undetermined, based upon the stacking of the aligned data values for the first order water bottom multiple travel time 336 and second order water bottom multiple events 337(1), 337(2) from the second matrix 335 of FIG. 3. However, as seen in graph 448, an intersection of the highest semblance values for both the water velocity 443 and the source height 442 can be found in an area 449 centered at a water velocity slightly below 1500 m/s and a source height slightly above 0. A preferred estimate for each of the water velocity 443 and the source height 442 can be determined by selection of a pixel having the highest value, for example, consistent with scale 444.

Estimation of water properties can, as described herein, include estimating properties of the water such as those affecting travel time of a wavefield, including, for example, estimation of the water velocity and/or the source height, based on one or more shots. This can include calculating travel times of events in the data for different values of these properties. The travel times can be used to align the events in the data and stack the data values for the events together in order to compute a semblance value. The best aligned events can produce the highest semblance value, and this can indicate that the properties belonging to these aligned events are the correct ones. In response to water property estimation, it may be possible to adjust measurements in a group of shots that have different types of values, such that they can be migrated (e.g., by converting x/y/time data to x/y/z data) with the same (or similar) velocity model (e.g., a subsurface map showing velocities in water volume temperature regions) and/or the same (or similar) source datum (e.g., where the seismic source stays in a same x/y/z position).

In various examples of the present disclosure, travel times of the direct arrival, the primary water bottom reflection, the first order water bottom multiple, and/or a combination of at least two of the direct arrival, the primary water bottom reflection, and/or the first order water bottom multiple in the measured data for different sets of water properties can be calculated. The measured data values can be aligned for these travel times, stacked, and a number of semblance values can be calculated for the different sets of water properties. The highest semblance value can relate to the correct water properties.

Embodiments of the present disclosure may be independent of acquisition geometry. For instance, embodiments of the present disclosure may be applied to data from one or more surface and/or near-surface streamers, one or more OBCs, and one or more nodes, where the data from the one or more surface and/or near-surface streamers, the one or more OBCs, and the one or more nodes can each be multi-component streamer data, and/or applied to data from a plurality of nodes near or on the water bottom, or any combination thereof, among other data acquisition approaches.

Water property estimation in accordance with one or more embodiments of the present disclosure can result in reduced labor costs. For instance, water property estimation as described herein, for example, utilizing semblance values, can be considered robust and non-labor intensive.

Embodiments of the present disclosure can be applied to time-lapse three-dimensional (4D) seismic surveying approaches. Aspects of the 4D field can include, for example, planning, acquisition, processing, interpretation, and/or characterization. In the field of 4D, correcting for the changes in the water properties over time may be important, and water property estimation in accordance with one or more embodiments of the present disclosure can be applied to 4D aspects, improving estimations and results of seismic surveying. For example, water properties may be estimated from data from a first seismic survey conducted for a specified subsurface formation. Water properties may also be estimated from data from a second seismic survey conducted for that subsurface formation. The data from the second seismic survey may then be corrected for the change in water properties from the time of the first seismic survey to the time of the second seismic survey, and the resultant corrected data may be analyzed for changes in the subsurface formation over time. In some embodiments, the difference in time can be various samplings and/or acquisitions in a single survey.

Figure 5:
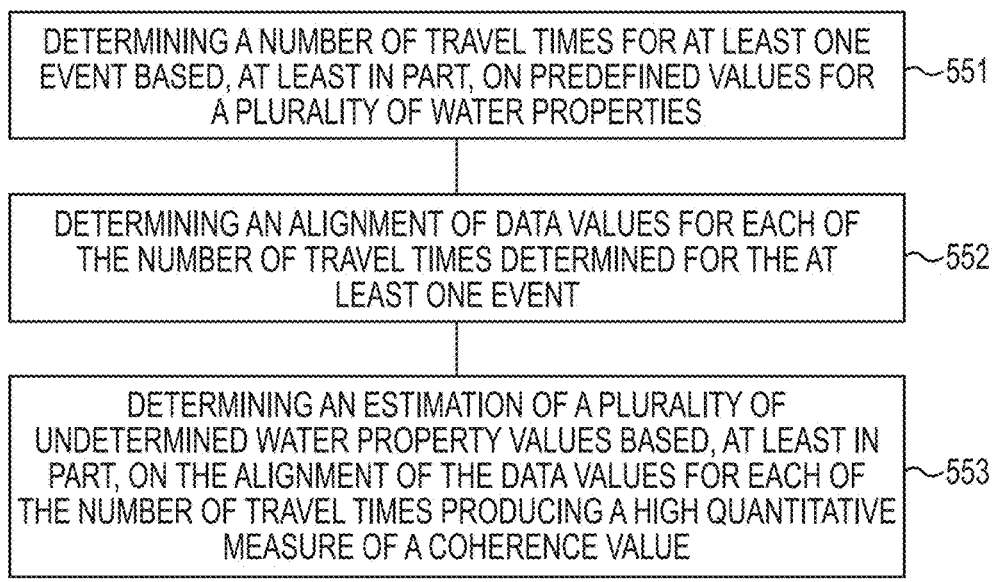
FIG. 5 illustrates a method flow diagram for estimation of water property values from seismic data according to one or more embodiments of the present disclosure.

FIG. 5 illustrates a method flow diagram for estimation of water property values from seismic data according to one or more embodiments of the present disclosure. As described herein, methods (e.g., determining, calculating, estimating, etc.) can be performed by a machine, for example, a computing device, processing at least a received first seismic data set including at least one event, as described herein.

As described herein, a first seismic data set and a second seismic data set, and possible additional seismic data sets, may be acquired and/or received at different times. Such seismic data sets can each include shot point gather data, travel times, etc., as described herein, for at least one event that can, in various embodiments, include a direct arrival, a primary water bottom reflection, a first order water bottom multiple, and/or a combination of at least two of a direct arrival, a first order water bottom multiple, and/or a primary water bottom reflection. In various embodiments, the at least one event in the seismic data set can include higher order water bottom multiples.

As shown at block 551 of FIG. 5, the method can include determining a number of travel times for the at least one event based, at least in part, on predefined values for a plurality of water properties, for example, the predefined values $s_x$, $s_y$, $r_x$, $r_y$, and $r_z$ described with regard to equations 1 and 2a-2c.

In various embodiments, determining the number of travel times for the at least one event can include determining a time between actuation of a seismic source and detection of a resultant wavefield by at least one seismic receiver. Determining the number of travel times can include predefining, in three dimensions, relative positions, at least in part, of a combination of at least two of the seismic source, the at least one seismic receiver, and at least one seismic reflector for each combination thereof At block 552, the method can include determining an alignment of data values for each of the number of travel times determined for the at least one event. In various embodiments, as described herein, the method can include determining a stacking of each of the number of travel times determined for the at least one event following alignment thereof At block 553, the method can include determining an estimation of a plurality of undetermined water property values based, at least in part, on the alignment of the data values for each of the number of travel times producing a high (or highest) quantitative measure of a coherence value, as described herein. In some embodiments, as described herein, producing the high (or highest) quantitative measure of the coherence value can include producing a high (or highest) semblance value. Among various embodiments of the present disclosure, determining the estimation of the plurality of undetermined water property values can include determining a source and/or determining a water velocity.

In various embodiments, as described herein, the method can include processing a second seismic data set, including at least one event, which is received at a different time than the received first seismic data set, by iterating a number of the method elements just presented. The method can include comparing estimations of at least one of the plurality of undetermined water property values determined from the received first and second seismic data sets and adjusting a value of the estimate of the at least one of the plurality of undetermined water property values based on the comparison.

In accordance with a number of embodiments of the present disclosure, a geophysical data product may be generated. In various embodiments, generating the geophysical data product can include obtaining geophysical data from a seismic survey (such as wavefield amplitude and/or velocity), as described herein, and/or processing the geophysical data. Processing the geophysical data can, among various embodiments, include determining a number of travel times for the at least one event based, at least in part, on predefined values for a plurality of water properties, determining an alignment of data values for each of the number of travel times determined for the at least one event, and determining an estimation of a plurality of undetermined water property values based, at least in part, on the alignment of the data values for each of the number of travel times producing a high (or highest) quantitative measure of a coherence value.

Geophysical data may be accessed, recorded, and/or stored on a non-transitory, tangible machine-readable medium that is, for example, suitable for importing onshore. The geophysical data product may be produced (e.g., recorded) by processing geophysical data offshore (by equipment on a marine seismic survey vessel) and/or onshore (at a facility on land) either within the United States or in another country. If the geophysical data product is produced offshore and/or in another country, it may be imported onshore to a facility in the United States. In some instances, once onshore in the United States, geophysical analysis may be performed on the geophysical data product. In some instances, geophysical analysis may be performed on the geophysical data product offshore. For example, estimation of the plurality of undetermined water property values can be determined from data obtained as it is being measured offshore to facilitate other processing of the measured data either offshore or onshore. As another example, the estimation of the plurality of undetermined water property values can be determined from data that has already been measured offshore or onshore to facilitate other processing of the measured data either offshore or onshore.

Figure 6:
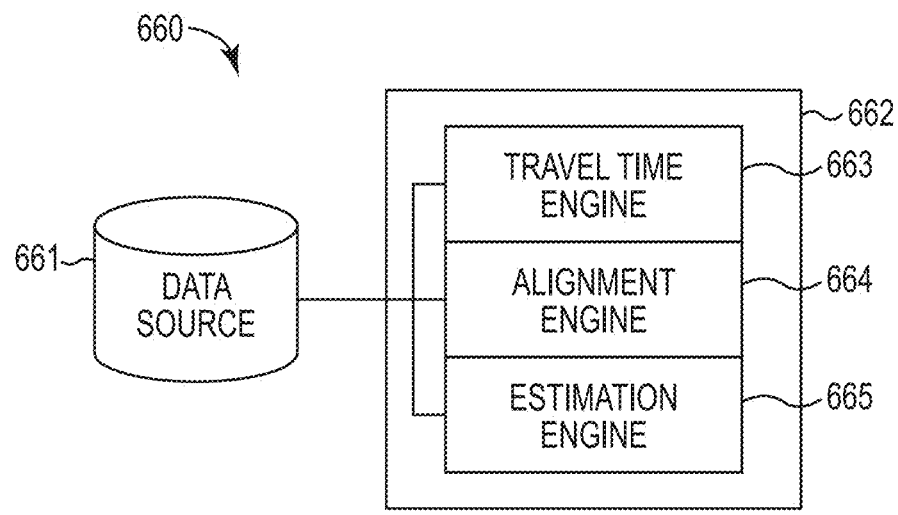
FIG. 6 illustrates a diagram of a system for estimation of water property values from seismic data according to one or more embodiments of the present disclosure.

FIG. 6 illustrates a diagram of a system for estimation of water property values from seismic data according to one or more embodiments of the present disclosure. The system 660 can include a data store 661, a subsystem 662, and/or a number of engines, such as a travel time engine 663, an alignment engine 664, and/or an estimation engine 665, and can be in communication with the data store 661 via a communication link. The system 660 can include additional or fewer engines than illustrated to perform the various functions described herein. The system 660 can represent program instructions and/or hardware of a machine (e.g., machine 770 as referenced in FIG. 7, etc.). As used herein, an "engine" can include program instructions and/or hardware, but at least includes hardware. Hardware is a physical component of a machine that enables it to perform (execute) a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium (MRM), computer-readable medium (CRM), etc.) as well as in a hard-wired program (e.g., logic). Hard-wired program instructions (e.g., logic) can be considered as both program instructions and hardware.

The travel time engine 663 can include a combination of hardware and program instructions that is configured to calculate, from received seismic data, a number of travel times for at least one wavefield based, at least in part, on predefined values for a plurality of water properties, as described herein, for example, with regard to equations 1 and 2a-2c. The alignment engine 664 can include a combination of hardware and program instructions that is configured to align the data values for each of the number of travel times determined for the at least one wavefield as measured by a plurality of seismic receivers.

In various embodiments, the alignment engine 664 can include a combination of hardware and program instructions to enable execution of horizontal alignment of the data values for each of the number of travel times selected from either a direct arrival and a primary water bottom reflection as measured by the plurality of seismic receivers to produce a first matrix and a separate horizontal alignment of a first order water bottom multiple as measured by the plurality of seismic receivers to produce a second matrix, for example, as described with regard to matrices 331 and 335 of FIG. 3. The instructions can further include instructions for subtraction of the second matrix from the first matrix to produce a third matrix, for example, as described with regard to matrix 338 of FIG. 3.

In various embodiments, the alignment engine 664 can include a combination of hardware and program instructions to execute determination of the horizontally aligned values to include compensation for polarity flips to produce the third matrix. In various embodiments, the alignment engine 664 can include a combination of hardware and program instructions to execute determination of the horizontally aligned values to include an estimated wavelet to produce the third matrix.

In various embodiments, the estimation engine 665 can include a combination of hardware and program instructions to estimate a plurality of undetermined water property values based, at least in part, on the alignment of the data values for each of the number of travel times producing a high (or highest) semblance value. In various embodiments, the system can include a stack engine including a combination of hardware and program instructions to horizontally stack values representative of the aligned measurements of the plurality of seismic receivers, for example, to provide a single trace. In various embodiments, the estimation engine 665 can estimate the plurality of undetermined water property values based, at least in part, on horizontally stacked values producing the high (or highest) semblance value.

Figure 7:
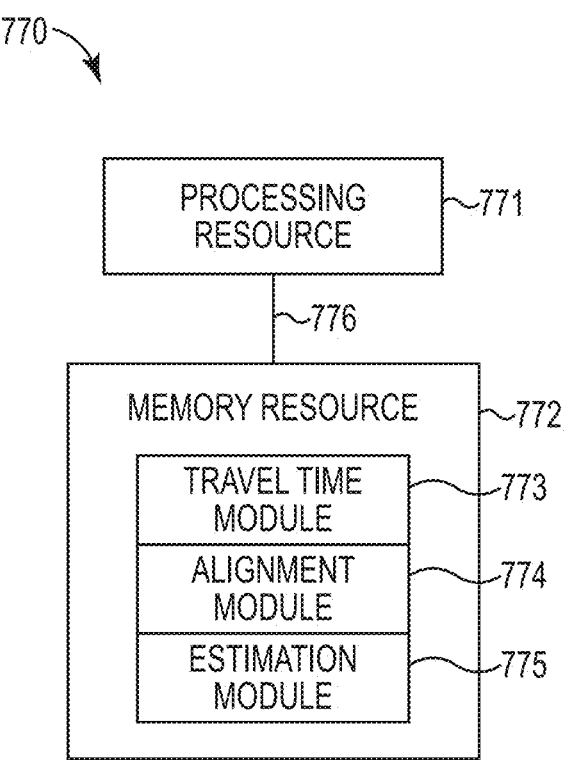
FIG. 7 illustrates a diagram of a machine for estimation of water property values from seismic data according to one or more embodiments of the present disclosure.

FIG. 7 illustrates a diagram of a machine for estimation of water property values from seismic data according to one or more embodiments of the present disclosure. The machine 770 can utilize software, hardware, firmware, and/or logic to perform a number of functions. The machine 770 can be a combination of hardware and program instructions configured to perform (execute) a number of functions (actions). The hardware, for example, can include a number of processing resources 771 and a number of memory resources 772, such as a MRM, CRM, or other memory resources. The memory resources 772 can be internal and/or external to the machine 770. For example, the machine 770 can include internal memory resources and have access to external memory resources, among other embodiments. The program instructions (e.g., machine-readable instructions (MRI), computer-readable instructions (CRI), etc.) can include instructions stored on the MRM to implement a particular function (action). For example, a set of MRI can be executable by one or more of the processing resources 771. The memory resources 772 can be coupled to the machine 770 in a wired and/or wireless manner. For example, the memory resources 772 can be an internal memory, a portable memory, a portable disk, and/or a memory associated with another resource (e.g., enabling MRI to be transferred and/or executed across a network, such as the Internet). As used herein, a "module" can include program instructions and/or hardware, but at least includes program instructions.

Memory resources 772 can be non-transitory and tangible and can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EE-PROM), phase change random access memory (PCRAM), magnetic memory, optical memory, and/or a solid state drive (SSD), etc., as well as other types of MRM.

The processing resources 771 can be coupled to the memory resources 772 via a communication path 776. The communication path 776 can be local or remote to the machine 770. Examples of a local communication path can include an electronic bus internal to a machine, where the memory resources 772 are in communication with the processing resources 771 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 776 can be such that the memory resources 772 are remote from the processing resources 771, such as in a network connection between the memory resources 772 and the processing resources 771. That is, the communication path 776 can be a network connection. Examples of such a network connection can include a local area network (LAN), wide area network (WAN), personal area network (PAN), and the Internet, among others.

As shown in FIG. 7, the MRI stored in the memory resources 772 can be segmented into a number of modules 773, 774, 775 that when executed by the processing resources 771 can perform a number of functions. As used herein, a module includes a set of instructions included to perform a particular task or action. The number of modules 773, 774, 775 can be sub-modules of other modules. For example, the travel time module 773 can be a sub-module of the alignment module 774 and/or the travel time module 773 and the alignment module 774 can be contained within a single module. Furthermore, the number of modules 773, 774, 775 can include individual modules separate and distinct from one another. Examples are not limited to the specific modules 773, 774, 775 illustrated in FIG. 7.

Each of the number of modules 773, 774, 775 can include program instructions and/or a combination of hardware and program instructions that, when executed by a processing resource 771, can function as a corresponding engine as described with respect to FIG. 6. For example, the travel time module 773 can include program instructions and/or a combination of hardware and program instructions that, when executed by a processing resource 771, can function as the travel time engine 663, the alignment module 774 can include program instructions and/or a combination of hardware and program instructions that, when executed by a processing resource 771, can function as the alignment engine 664, and/or the estimation module 775 can include program instructions and/or a combination of hardware and program instructions that, when executed by a processing resource 771, can function as the estimation engine 665.

As described herein, the travel time module 773 can include instructions to receive two sets of 3D seismic data acquired at different times, which form 4D seismic data and to calculate travel times of events in the 4D seismic data based, at least in part, on predefined values for a plurality of water properties associated with the 4D seismic data. In various embodiments, the travel time module 773 can include instructions executable to calculate the travel times of the events by application of at least one of different weights to events measured at different distances from a seismic source and/or different phase rotations to events measured at different angles relative to the seismic source, as described herein.

The alignment module 774 can include instructions to align the events based on the calculated travel times for each of the different times. In various embodiments, the machine 770 can include a stack module that includes instructions to stack the aligned events for each of the different times.

In various embodiments, the estimation module 775 can include instructions to compute a semblance representation for two (previously undetermined) water properties based on the aligned and stacked events for each of the different times. As described herein, the estimation module 775 can include instructions to determine an estimation of two (previously undetermined) water property values associated with the 4D seismic data based on computed semblance values for each of the different times. Accordingly, the estimation module 775 can include instructions to analyze the estimation of the two water property values for each of the different times to detect a change in configuration of a seismic reflector.

For example, an oil reservoir under a water bottom can be relatively small. Over time, a portion of the oil can be replaced by water, possibly resulting from extraction of the oil. The reflection of wavefields generated by a seismic source differs based on whether the wavefield impacts oil or water. As such, for example, data derived from shot point gathers from different times can be analyzed to determine a change in position or volume of the oil relative to the water. The estimation of undetermined water property values from seismic data described herein can improve accuracy of the determination of, for example, a change in position or volume of the oil relative to the water. Such improvement can result from, for example, improved accuracy of source height and/or water velocity estimations improving accuracy of reflection travel time calculations, as described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for estimation of water properties from seismic data, comprising:
   receiving, by a machine, a first seismic data set measured by a plurality of seismic receivers having three-dimensional (3D) coordinates and based on an operation of a plurality of seismic sources having 3D coordinates, wherein the received first seismic data set is indicative of a subterranean formation;
   processing, by the machine, a received first seismic data set comprising at least one event, wherein the processing comprises:
      determining, by the machine, a number of travel times for the at least one event based, at least in part, on the 3D coordinates of the plurality of seismic sources, the 3D coordinates of the plurality of seismic receivers, and water velocity;
      determining, by the machine, an alignment of data values for each of the number of travel times determined for the at least one event;
      compensating for time differences for detection of the at least one event resulting from increasing distance of the plurality of seismic receivers based on the alignment such that the at least one event appears to be detected by the plurality of the seismic sources at the same time;
      determining, by the machine, an estimation of a plurality of undetermined water property values based, at least in part, on the alignment of the data values for each of the number of travel times producing a high quantitative measure of a coherence value and the time compensation,
      wherein the coherence value is determined based on a number of coefficient values;
   generating a seismic image based on and incorporating the estimation of the plurality of undetermined water property values that is better indicative of the subterranean formation that the received first seismic data set; and
   a tangible machine-readable medium storing the seismic image.

2. The method of claim 1, comprising determining a stacking of the data values for each of the number of travel times determined for the at least one event following alignment thereof.

3. The method of claim 2, wherein producing the high quantitative measure of the coherence value comprises producing a high semblance value.

4. The method of claim 1, wherein determining the estimation of the plurality of undetermined water property values comprises determining a source height and determining a water velocity.

5. The method of claim 1, wherein determining the number of travel times for the at least one event comprises determining a time between actuation of a seismic source and detection of a resultant wavefield by at least one seismic receiver.

6. The method of claim 5, comprising predefining, in three dimensions, relative positions, at least in part, of a combination of at least two of the seismic source, the at least one seismic receiver, and at least one seismic reflector for each combination thereof.

7. The method of claim 1, comprising:
   processing a second seismic data set comprising at least one event, received at a different time than the received first seismic data set, by iterating the elements of claim 1;
   comparing estimations of at least one of the plurality of undetermined water property values determined from the received first and second seismic data sets; and
   adjusting a value of the estimate of the at least one of the plurality of undetermined water property values based on the comparison.

8. The method of claim 1, wherein the at least one event in the first seismic data set comprises a direct arrival.

9. The method of claim 1, wherein the at least one event in the first seismic data set comprises a first order water bottom multiple.

10. The method of claim 1, wherein the at least one event in the first seismic data set comprises a primary water bottom reflection.

11. The method of claim 1, wherein the at least one event in the first seismic data set comprises a combination of at least two of a direct arrival, a first order water bottom multiple, and a primary water bottom reflection.

12. A system for estimation of water properties from seismic data, comprising:
   a data store to store seismic data measured by a plurality of seismic receivers having three-dimensional (3D) coordinates and based on an operation of a plurality of seismic sources having 3D coordinates, wherein the stored seismic data is indicative of a subterranean formation
   a travel time engine comprising hardware to calculate, based on, at least in part, the stored seismic data, the 3D coordinates of the plurality of seismic sources, the 3D coordinates of the plurality of seismic receivers, and water velocity, a number of travel times for at least one wavefield;

an alignment engine comprising hardware to:
  align data values for each of the number of travel times determined for the at least one wavefield as measured by the plurality of seismic receivers; and
  compensate for time differences for detection of at least one event resulting from increasing distance of the plurality of seismic receivers based on the alignment such that the at least one event appears to be detected by the plurality of the seismic sources at the same time;
an estimation engine comprising hardware to:
  estimate a plurality of undetermined water property values based, at least in part, on the alignment of the data values for each of the number of travel times producing a high semblance value and the compensation;
  generate a seismic image based on and incorporating the estimation of the plurality of undetermined water property values that is better indicative of the subterranean formation that the stored seismic data; and
  store the seismic image in a tangible machine-readable medium.

13. The system of claim 12, wherein the alignment engine executes:
  horizontal alignment of the data values for each of the number of travel times selected from either a direct arrival or a primary water bottom reflection as measured by the plurality of seismic receivers to produce a first matrix and a separate horizontal alignment of a first order water bottom multiple as measured by the plurality of seismic receivers to produce a second matrix.

14. The system of claim 13, wherein the alignment engine executes subtraction of data values of the second matrix from corresponding data values of the first matrix to produce a third matrix.

15. The system of claim 13, wherein the alignment engine executes multiplication of data values of the second matrix by corresponding data values of the first matrix to produce a third matrix.

16. The system of claim 13, wherein the alignment engine executes determination of the horizontally aligned data values to comprise compensation for polarity flips to produce the third matrix.

17. The system of claim 13, wherein the alignment engine executes determination of the horizontally aligned data values to comprise an estimated wavelet to produce the third matrix.

18. The system of claim 13, comprising a stack engine to horizontally stack data values representative of the aligned measurements of the plurality of seismic receivers.

19. The system of claim 18, wherein the estimation engine estimates the plurality of undetermined water property values based, at least in part, on the horizontally stacked data values producing the high semblance value.

20. A non-transitory machine-readable medium storing instructions executable by a processing resource to cause a machine to:
  receive two sets of three-dimensional (3D) seismic data acquired at different times and measured by a plurality of seismic receivers having 3D coordinates and based on an operation of a plurality of seismic sources having 3D coordinates, wherein the received first seismic data set is indicative of a subterranean formation, and wherein the two sets of 3D seismic data form four-dimensional (4D) seismic data;
  calculate travel times of events in the 4D seismic data based, at least in part, on the 3D coordinates of the plurality of seismic sources, the 3D coordinates of the plurality of seismic receivers, and water velocity associated with the 4D seismic data;
  align the events based on the calculated travel times for each of the different times;
  compensate for time differences for detection of the events resulting from increasing distance of the plurality of seismic receivers based on the alignment such that the events appear to be detected by the plurality of the seismic sources at the same time;
  stack the aligned events for each of the different times;
  compute a semblance representation for two water properties based on the aligned and stacked events for each of the different times and the compensation;
  determine an estimation of two water property values associated with the 4D seismic data based on computed semblance values for each of the different times;
  generate a seismic image based on and incorporating the estimation of the two water property values that is better indicative of the subterranean formation that the received first seismic data set; and
  store the seismic image.

21. The medium of claim 20, wherein the instructions executable to calculate the travel times of the events comprise instructions to apply at least one of different weights to events measured at different distances from a seismic source and different phase rotations to events measured at different angles relative to the seismic source.

22. The medium of claim 20, comprising instructions to analyze the estimation of the two water property values for each of the different times to detect a change in configuration of a seismic reflector.

23. A method of generating a geophysical data product, the method comprising:
  obtaining geophysical data from a seismic survey and measured by a plurality of seismic receivers having three-dimensional (3D) coordinates and based on an operation of a plurality of seismic sources having 3D coordinates, wherein the geophysical data is indicative of a subterranean formation;
  processing the geophysical data to generate the geophysical data product, wherein processing the geophysical data comprises:
    determining a number of travel times for the at least one event based, at least in part, on the 3D coordinates of the plurality of seismic sources, the 3D coordinates of the plurality of seismic receivers, and water velocity;
    determining an alignment of data values for each of the number of travel times determined for the at least one event;
    compensating for time differences for detection of the at least one event resulting from increasing distance of the plurality of seismic receivers based on the alignment such that the at least one event appears to be detected by the plurality of the seismic sources at the same time;
    determining an estimation of a plurality of undetermined water property values based, at least in part, on the alignment of the data values for each of the number of travel times producing a high quantitative measure of a coherence value and the compensation, wherein the coherence value is determined based on a number of coefficient values;

generating a seismic image based on and incorporating the estimation of the plurality of undetermined water property values that is better indicative of the subterranean formation that the obtained geophysical data; and recording the seismic image on a non-transitory machine-readable medium, thereby generating the geophysical data product.

24. The method of claim 23, further comprising recording the geophysical data product on a non-transitory, tangible machine-readable medium suitable for importing onshore.

* * * * *